(12) United States Patent
Stavila et al.

(10) Patent No.: US 10,000,377 B1
(45) Date of Patent: Jun. 19, 2018

(54) NANOSTRUCTURED METAL AMIDES AND NITRIDES FOR HYDROGEN STORAGE

(71) Applicant: National Technology & Engineering Solutions of Sandia, LLC, Albuquerque, NM (US)

(72) Inventors: Vitalie Stavila, Pleasanton, CA (US); Leonard E. Klebanoff, Dublin, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 73 days.

(21) Appl. No.: 15/244,762

(22) Filed: Aug. 23, 2016

Related U.S. Application Data

(60) Provisional application No. 62/235,930, filed on Oct. 1, 2015.

(51) Int. Cl.
*C01B 6/04* (2006.01)
*C01B 6/24* (2006.01)
(Continued)

(52) U.S. Cl.
CPC .......... *C01B 3/0078* (2013.01); *C01B 3/0084* (2013.01); *C01B 3/04* (2013.01)

(58) Field of Classification Search
CPC . B01J 35/04; B01J 21/066; B01J 23/10; B01J 23/63; B01J 35/0006; B01J 37/0244;
(Continued)

(56) References Cited

U.S. PATENT DOCUMENTS

| 6,967,012 | B2 | 11/2005 | Meisner |
| 2006/0127304 | A1* | 6/2006 | Fujii .................. B01J 20/04 423/644 |

(Continued)

FOREIGN PATENT DOCUMENTS

| JP | 2005306724 A | 11/2005 |
| JP | 2007091497 A | 4/2007 |

(Continued)

OTHER PUBLICATIONS

Chen, et al., "Interaction Between Lithium Amide and Lithium Hydride", Journal of Physical Chemistry B, vol. 107, No. 39, Sep. 10, 2003, pp. 10967-10970.

(Continued)

*Primary Examiner* — Anthony J Zimmer
*Assistant Examiner* — Syed T Iqbal
(74) *Attorney, Agent, or Firm* — Medley, Behrens & Lewis, LLC

(57) ABSTRACT

Nanostructured metal amides and nitrides are incorporated into nanoporous templates, such as carbon, using liquid ammonia as a solvent/reagent. This leads to unexpected improvements in metal amide nanoconfined hydrogen storage materials. The resulting nanostructured materials may reversibly absorb and desorb large capacities of hydrogen under conditions that are much milder compared to what has been achieved with bulk materials. In addition, the nanoconfined materials may reduce the amounts of ammonia released upon dehydriding, which may make the released hydrogen gas purer and may limit the capacity loss. In addition, nanoconfinement may simplify the reaction mechanism, eliminating undesired metal imide intermediates and promote hydrogen cycling under mild conditions. The liquid ammonia method also allows the simultaneous (Continued)

introduction of catalytic additives along with the parent hydrogen storage material.

20 Claims, 2 Drawing Sheets

(51) Int. Cl.

| | |
|---|---|
| *C01B 3/06* | (2006.01) |
| *B01J 20/04* | (2006.01) |
| *H01M 8/06* | (2016.01) |
| *C01B 3/00* | (2006.01) |
| *C01B 3/04* | (2006.01) |

(58) Field of Classification Search
CPC ............. B01J 37/0248; B01J 37/088; B01J 2208/00017; B01J 23/005; B01J 23/42; B01J 23/44; B01J 37/0201; B01J 37/08; B01J 8/26; B01J 19/088; B01J 20/0207; B01J 20/10; B01J 20/28004; B01J 20/28007; B01J 20/28033; B01J 20/32; B01J 21/04; B01J 21/063; B01J 2208/00752; B01J 2219/00166; B01J 2219/0809; B01J 2219/0841; B01J 2219/0843; B01J 2219/0877; B01J 2229/42; B01J 23/002; B01J 23/02; B01J 23/22; B01J 23/462; B01J 23/464; B01J 27/24; B01J 33/00; B01J 35/002; B01J 35/0033; B01J 35/004; B01J 35/023; B01J 35/10; B01J 35/1014; B01J 35/1019; B01J 35/1038; B01J 37/0045; B01J 37/0215; B01J 37/0221; B01J 37/04; B01J 37/082; B01J 6/004; B01J 8/0015; B01J 8/1836; C01B 13/0207; C01B 13/0248; C01B 21/064; C01B 21/0645; C01B 2202/06; C01B 2202/08; C01B 2203/0233; C01B 2203/0244; C01B 2203/0405; C01B 2203/066; C01B 2203/1217; C01B 2203/1235; C01B 2204/32; C01B 25/45; C01B 31/0423; C01B 31/043; C01B 31/0476; C01B 31/06; C01B 31/086; C01B 31/125; C01B 32/15; C01B 32/154; C01B 32/184; C01B 32/192; C01B 32/194; C01B 32/225; C01B 32/23; C01B 32/36; C01B 33/00; C01B 33/02; C01B 33/021; C01B 33/06; C01B 33/148; C01B 33/149; C01B 3/0005; C01B 3/0015; C01B 3/0078; C01B 3/061; C01B 3/323; C01B 3/38; C01B 3/505; C01B 4/00; C01B 3/04; C01B 3/0084

See application file for complete search history.

(56) References Cited

U.S. PATENT DOCUMENTS

2006/0278159 A1* 12/2006 Gregory .............. B01J 27/22
117/68
2009/0121184 A1 5/2009 Fujii

FOREIGN PATENT DOCUMENTS

| JP | 2008013375 A | 1/2008 |
|---|---|---|
| JP | 2008073582 A | 4/2008 |

OTHER PUBLICATIONS

Chen, et al., "Interaction of Hydrogen with Metal Nitrides and Imides", Nature, vol. 420, Nov. 21, 2002, pp. 302-304.

Cui, et al., "Structural Transition of Li3N Under High Pressure: A First-Principles Study", Solid State Communications, vol. 149, No. 15-16, Apr. 2009, pp. 612-615.

Demir-Cakan, et al., "Modification of the Hydrogen Storage Properties of Li3N by Confinement Into Mesoporous Carbons", Energy and Environmental Science, vol. 4, 2011, pp. 3625-3631.

Ichikawa, et al., "Lithium Nitride for Reversible Hydrogen Storage", Journal of Alloys and Compounds, vol. 365, 2004, pp. 271-276.

Jewell, et al., "Metal Nitride Nanostructures as Hydrogen Storage Materials", WHEC 16, Jun. 13, 2006, pp. 1-10.

Klebanoff, L.E., "Hydrogen Storage Technology", Dec. 12, 2012, pp. 157-161.

Lamb, et al., "Mitigation of Hydrogen Capacity Losses During Pressure Cycling of the Li3N—H System by the Addition of Nitrogen", Journal of Physical Chemistry C, vol. 115, No. 29, Jun. 13, 2011, pp. 14386-14391.

Meisner, et al, "Study of the Lithium-Nitrogen-Hydrogen System", Journal of Alloys and Compounds, vol. 404, Dec. 8, 2005, pp. 24-26.

Xia, et al., "Carbon-Coated Li3N Nanofibers for Advanced Hydrogen Storage", Advanced Materials, vol. 25, Aug. 31, 2013, pp. 6238-6244.

* cited by examiner

NANOSTRUCTURED METAL AMIDES AND NITRIDES FOR HYDROGEN STORAGE

CROSS-REFERENCE TO RELATED APPLICATION

This application claims the benefit of priority of U.S. Provisional Patent Application Ser. No. 62/235,930, filed Oct. 1, 2015, and entitled "Nanostructured metal amides and nitrides for hydrogen storage," the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

FIELD

This disclosure relates to energy storage materials, and more particularly to hydrogen energy storage.

BACKGROUND

Hydrogen-based energy storage systems are known and have been investigated as solutions for powering many technological developments including, in particular, electric vehicles. Hydrogen-based energy is particularly desirable because hydrogen gas reacts cleanly with air in a fuel cell, producing water as a by-product. Such systems face challenges that have not, as of yet, found a suitable solution. Hydrogen-based solid-state energy storage systems also lose significant capacity as they operate through charging and discharging cycles. It would also be advantageous to improve the amount of hydrogen that can be stored and discharged from the same weight or volume of storage material. This would promote the use of hydrogen fuel cells in light-duty vehicles and other applications.

Complex metal hydrides show potential for hydrogen storage applications due to their high hydrogen content. In particular, bulk compositions of metal imides (—NH) and amides (—NH$_2$) consisting of Li, Mg, Na, B, Al, Be, Zn and their mixtures have shown potential as reversible hydrogen storage materials (reversible meaning rechargeable by a reverse reaction after hydrogen release). These metal hydride mixtures are typically synthesized by ball milling. In the hydrogenated state (outside of extreme operating conditions), such compositions comprise a metal amide and a metal hydride and in the dehydrogenated state, the materials of such compositions comprise a metal imide and a metal hydride Bulk metal amides have several drawbacks including limited cycle-life, occurrence of stable nonreactive imide species, and contamination of hydrogen with ammonia gas. Ammonia release irreversibly damages the hydrogen storage material since it removes nitrogen from the material, leading to reduced capacity. In addition, bulk metal-nitrides form as the end products and are known to be reluctant towards hydrogenation, adversely affecting the kinetics of the hydrogenation reaction needed for a fully cycling material.

Nanoconfinement has been explored as a promising route to improve the LiNH$_2$/LiH energy storage systems. Janot and co-workers developed an innovative synthetic route to Li$_3$N@carbon (the @ sign meaning "confinement in") by wet impregnation of mesoporous carbons using solutions of lithium azide, followed by a thermal treatment allowing the transformation of lithium azide into lithium nitride. The resulting Li$_3$N@carbon composites displayed improved hydrogen storage properties compared to bulk LiNH$_2$/LiH with fast hydrogen absorption/desorption kinetics at 200° C. and above. The 20 wt. % Li$_3$N-loaded composite lead to a reversible hydrogen storage capacity of 1.8 wt. %. (R. Demir-Cakan, W. S. Tang, A. Darwiche and R. Janot, Energy & Environmental Science, 2011, 4, 3625-3631.) Xia et al. expanded this approach by synthesizing carbon-coated Li$_3$N nanofibers by a single-nozzle electrospinning technique. (G. Xia, D. Li, X. Chen, Y. Tan, Z. Tang, Z. Guo, H. Liu, Z. Liu and X. Yu, Advanced Materials, 2013, 25, 6238-6244.) Xia et al, used a polymer-LiN$_3$ mixture as the precursor, which can serve as the templating agent for lithium nitride formation. The carbon-coated Li$_3$N porous nanofibers exhibited some reversibility over 10 de-/re-hydrogenation cycles at 250° C., however there was a significant capacity loss, presumably due to ammonia formation.

SUMMARY

A process for making a nanocomposite includes the steps of: combining a nanoporous template with an alkaline or alkaline-earth metal dissolved in liquid ammonia; reacting the alkaline or alkaline-earth metal with ammonia to form nanostructures including an alkaline metal nitride or alkaline-earth metal nitride corresponding to formula I, a mixed metal amide-metal hydride composition of formula II, or both:

$$M_3N_x \qquad (I)$$

$$M(NH_2)_y/MH_z \qquad (II)$$

wherein M is independently selected from Li, Na, K, Rb, Cs, Be, Mg, Ca, Sr, Ba, or combinations thereof, and x, y, and z are independently selected from 1 or 2, wherein the nanostructures form in pores of the porous template.

A reversible hydrogen-storage nanocomposite id described herein. The nanocomposite includes: a nanoporous template and nanostructures comprising an alkaline metal nitride or alkaline-earth metal nitride corresponding to formula I, a mixed metal amide-metal hydride composition of formula II, or both:

$$M_3N_x \qquad (I)$$

$$M(NH_2)_y/MH_z \qquad (II)$$

wherein M is independently selected from Li, Na, K, Rb, Cs, Be, Mg, Ca, Sr, Ba, or combinations thereof, and x, y, and z are independently selected from 1 or 2, and the nanostructures are confined in pores of the nanoporous template; and the weight percent of the nanostructures corresponding to formulas I or II is 30% or greater based on the total weight of the nanocomposite.

A method of cycling an energy-storage nanocomposite material that includes metal nitride or mixed metal amide-metal hydride nanostructures, or both, comprises the steps of: cycling the nanocomposite material by charging hydrogen to the nanocomposite material to form a metal amide/metal hydride nanostructure in a hydrogenated state, and reversibly discharging hydrogen from the nanocomposite material to directly form a metal nitride in a dehydrogenated state according to at least one of the following reactions:

M'$_3$N+2H$_2$⇌2M'H+M'NH$_2$, wherein M' is an alkali metal or

M"$_3$N$_2$+4H$_2$⇔M"(NH$_2$)$_2$+2M"H$_2$, wherein M" is an alkaline-earth metal;

wherein the temperature of the nanocomposite material in the cycling step is 80° C. to 300° C.

As disclosed herein, nanostructured metal amides and nitrides may be synthesized by incorporation of the bulk materials into nanoporous templates, such as carbon, using ammonia as a solvent/reagent. This leads to unexpected and surprising improvements in the properties of metal amide nanoconfined hydrogen storage materials. The resulting materials may reversibly absorb and desorb their full theoretical amount of hydrogen under conditions that are much milder compared to what has been achieved with bulk materials. In addition, the nanoconfinement may reduce the amounts of ammonia released upon dehydriding, which would make the released hydrogen gas purer and would therefore limit the capacity loss. In addition, nanoconfinement may simplify the reaction mechanism, eliminating undesired metal imide intermediates.

The above description presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
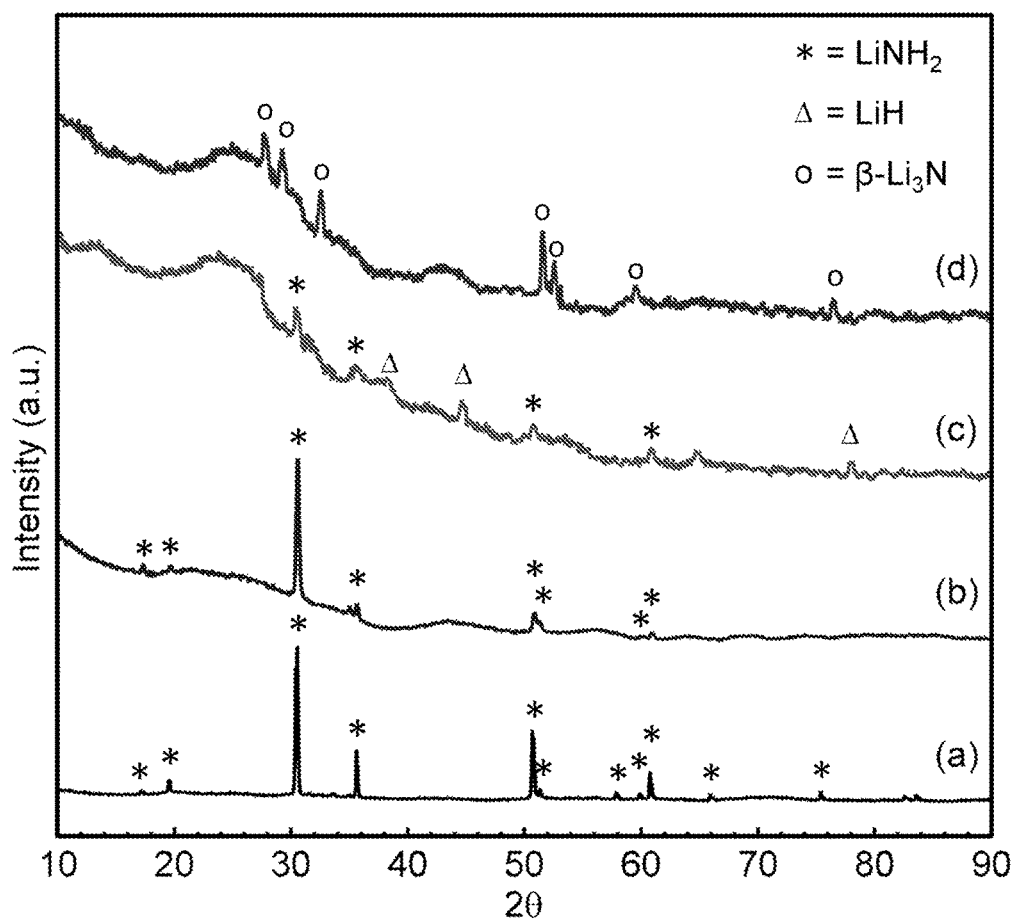
FIG. 1 is a graph showing data obtained by PXRD (powder X-ray diffraction) of the nanoconfined material of Example 1.

Disclosed herein is a method and a system of nanoconfining an alkaline or alkaline-earth metal amide in a nanoporous template and the use of the resulting composite material for reversible hydrogen storage applications. These materials can reversibly absorb and desorb hydrogen under conditions that are much milder compared to the same material in the bulk state. In addition, the nanoconfinement reduces the amounts of ammonia released upon dehydriding, which makes the released hydrogen gas more pure and limits the capacity degradation due to the loss of active material through cycling. Finally, the nanoconfinement method described herein appears to simplify and improve the reaction mechanism, eliminating undesired intermediates (such as Li$_2$NH). The method utilized herein allows the use of metals in their elemental state as starting materials.

Compositions of metal amides and hydrides based on alkali- and alkaline-earth metals decompose upon heating to release hydrogen (and ammonia) and sometimes can be fully or partially recharged by applying hydrogen pressure. Bulk metal amides have a theoretical hydrogen storage capacity of greater than 10 weight percent, such as 10.4 weight percent for the Li$_3$N+2H$_2$<=>LiNH$_2$+2LiH reaction. But only much lower capacities than the theoretical maximum have been realized, e.g., less than 3 wt %, when the metal amide is nanoconfined in a nanoporous host.

It was discovered that this theoretical capacity can be approached by the nanostructured material and method disclosed herein. To achieve improved hydrogen capacity, the nanostructured materials disclosed herein function to both stabilize and catalyze the metastable complex metal hydrides, even in the absence of solvents. Furthermore, in contrast to bulk metal amide materials, embodiments disclosed herein, provide surprisingly improved cycle-life, reduction or complete suppression of undesired stable imide (NH) species by-products, and a dramatic decrease in the contamination of the discharged hydrogen with ammonia gas.

Complex metal hydrides represent a class of compounds composed of metal cations and 'complex' hydrogen-containing anions such as alanates (AlH$_4^-$), borohydrides (BH$_4^-$), and amides (NH$_2^-$). In general, hydrogen gas can be released from complex hydrides either by heating or by a chemical reaction, such as hydrolysis or aminolysis. However, such reactions are extremely down-hill energetically (i.e. they have a large negative enthalpy of reaction), and require significant energy input to regenerate the starting material(s).

The hydrogenation of bulk lithium nitride (Li$_3$N) to LiNH$_2$ proceeds according to the following reaction sequence: Equation 1.

$$Li_3N \underset{-H_2}{\overset{+H_2}{\rightleftharpoons}} Li_2NH + LiH \underset{-H_2}{\overset{+H_2}{\rightleftharpoons}} LiNH_2 + 2LiH \qquad \text{Equation 1}$$

The overall reaction has a theoretical H$_2$ capacity of 10.4%. The first step involves the reaction of Li$_3$N with one mole of hydrogen to form lithium imide (Li$_2$NH) and lithium hydride (LiH), while in the second step Li$_2$NH reacts with hydrogen forming lithium amide (LiNH$_2$) and another equivalent of LiH. The hydrogen absorption reactions are exothermic; the enthalpy of the first step is −115 kJ/mol H$_2$ while the second step has a lower enthalpy of −45 kJ/mol H$_2$. The high value of ΔH in the first step makes it difficult to desorb hydrogen from Li$_2$NH. As a result, LiNH$_2$/2LiH mixtures require temperatures in excess of 320° C. and application of vacuum in order to form Li$_3$N in bulk, releasing an amount lower than the 10.4 wt. % of hydrogen contained in the original LiNH$_2$/2LiH material. In fact, the full capacity of 10.4% is accessible only above 400° C. in bulk. However, such extreme conditions are not energy efficient and may not be possible for many applications. For example, such conditions are not compatible with proton exchange membrane (PEM) fuel cell applications. In addition, in such bulk LiNH$_2$/2LiH systems, the equilibrium pressure is too low (less than 1 bar H$_2$), which means no overpressure of H$_2$ is created below 400° C. The H$_2$ storage material must be able to create at least 3 to 5 bar H$_2$ pressure at equilibrium in order to be used in conjunction with PEM fuel cells.

If the lithium amide material cycles only between the two states (LiNH$_2$+2LiH) and (Li$_2$NH+LiH) then the theoretical hydrogen storage capacity is reduced to 6.5 wt. %. As indicated herein, the reversing conditions are too harsh to fully cycle the materials as indicated in Equation 1. The reaction in the bulk state is not optimum from both thermodynamic and kinetic considerations. Another problem with the bulk LiNH$_2$/LiH system is the formation of ammonia by-product, which contaminates the hydrogen gas stream. In contrast, the purity of discharged hydrogen gas in embodiments of the nanoconfined materials disclosed herein may exceed 99.5%, and range from 95 to 99.9%, or 98% to 99.7%.

In bulk, LiNH$_2$/2LiH composites release about 6 wt. % hydrogen between 200 and 300° C. Further heating the sample to temperatures greater than 320° C. releases an additional about 3 wt. % hydrogen. However, the release of hydrogen is not fully reversible from such systems. The known pressure-composition-temperature (PCT) measurements show that the bulk material displays a two-step hydrogenation/dehydrogenation behavior consistent with Equation 1. The first step has an equilibrium pressure below about 0.07 bar for temperatures 255° C. and below. The second plateau has a higher equilibrium pressure of about 0.8 bar at 255° C., however this value is still below the 3 to 5 bar that is required for PEM fuel cell applications.

The hydrogenation of Li$_3$N proceeds first to the "imide" step Li$_2$NH and LiH. Further reaction of Li$_2$NH and H$_2$ leads to lithium amide LiNH$_2$ and a stoichiometric amount of LiH (see Equation 1). It has been hypothesized that one of the driving forces for the reaction between LiNH$_2$ and 2LiH is strong protoc (Hδ+)-hydridic (Hδ−) interactions, since hydrogen has a positive character in LiNH$_2$, and negative character in LiH. Ammonia release in this system has previously been examined; and it has been found that LiNH$_2$ can decompose directly into lithium imide and ammonia according to Equation 2.

$$2LiNH_2 \rightarrow Li_2NH + NH_3 \quad \Delta H = 84.1 \text{ kJ/mol } NH_3 \quad \text{Equation 2}$$

Bulk LiNH$_2$ starts releasing NH$_3$ as low as about 200° C., and the reaction rate is significantly increased at about 350° C. Ammonia release from the LiNH$_2$/LiH system is a concern for practical hydrogen storage systems for two reasons. First, nitrogen release is problematic as it is accompanied by a loss in hydrogen capacity upon subsequent cycles. In addition, ammonia gas represents a poison for the PEM fuel cell catalyst. It has previously been found that heating mixtures of LiNH$_2$ and LiH tended to release reduced levels of NH$_3$, and hydrogen forms instead.

The kinetics of hydrogen release and absorption from bulk LiNH$_2$/LiH mixtures are generally sluggish. Introducing 1 mol % of TiCl$_3$ into mixtures of 1:1 LiNH$_2$/LiH not only improves the reaction rates, but also dramatically reduces the amount of NH$_3$ release. It is believed that titanium catalyzes the reaction between LiNH$_2$ and LiH to form molecular hydrogen, increasing the rate of H$_2$ release at low temperatures (about 220° C.), such that all the LiNH$_2$ is dehydrogenated before significant amounts of NH$_3$ can form. The ammonia loss is generally irreversible, unless the nitrogen can be introduced back into the amide system.

As appreciated by those of skill in the art, the chemical equations 1 and 2 above, are similar for other alkaline or alkaline earth metals other than lithium according to Equations 3 and 4:

$$M'_3N + 2H_2 \Leftrightarrow 2M'H + M'NH_2, \quad \text{Equation 3}$$

$$M''_3N_2 + 4H_2 \Leftrightarrow M''(NH_2)_2 + 2M''H_2, \quad \text{Equation 4}$$

where M' equals an alkali metal and where M" equals an alkaline-earth metal. The extreme temperature and/or pressure requirements to cycle to the fully dehydrogenated state (metal nitride) are also a problem with other metal amides/metal hydrides in the bulk state.

In the nanoconfined embodiments disclosed herein, the reaction steps are as shown in Equation 1. However, in contrast to the drawbacks mentioned above, in an embodiment, the metal amides synthesized as disclosed herein and disposed in the nanoporous template, surprisingly reacted much more efficiently in proceeding to the fully hydrogenated (metal amide/metal hydride) and dehydrogenated (metal nitride) steps. (This cycling corresponds to fueling and emptying a hydrogen storage tank.) This allowed substantially greater capacity to be used, i.e., more hydrogen could be discharged from the material, and required significantly less energy in terms of heat to cause the reaction to proceed during hydrogen release.

As may be appreciated by the above discussion, the bulk synthesized metal amide/metal hydride compositions will not cycle to the fully dehydrogenated metal nitride state at temperatures under 300° C. In contrast, the compositions disclosed herein cycle between a metal nitride and a metal amide/metal hydride in the dehydrogenated and rehydrogenated state, respectively, at temperatures less than 300° C.

The metals for the nanoconfined reversible hydrogen storage composition include alkaline or alkaline-earth metals, or mixtures thereof. In an embodiment, the alkaline or alkaline-earth metal nitrides formed and present in the discharged (dehydrogenated) state may be of the general formula M$_3$N$_x$, wherein M is Li, Na, K, Rb, Cs, Be, Mg, Ca, Sr, or Ba, and x is 1 or 2. Furthermore, in an embodiment, the mixed metal amide and metal hydride composition in the charged (hydrogenated) state may be of the general formula M(NH$_2$)$_y$/M'H$_z$, wherein M, M' is Li, Na, K, Rb, Cs, Be, Mg, Ca, Sr, or Ba, and y is 1 or 2 and z is 1 or 2.

The metal amides synthesized in the process described herein produce a beta crystal structure. In a particular embodiment, β-LiNH$_2$, is formed.

In an embodiment, the nanoconfined reversible hydrogen storage composition also includes a catalytic amount of one or more catalytic additives such as potassium compounds to improve the kinetics of both dehydrogenation and rehydrogenation. For example, a catalytic amount, may be 0.5-8 mole percent, such as 1 to 5 mol percent, or 1.5 to 3 mol percent.

In an embodiment one or more catalysts may be selected from titanium trichloride, titanium tetrachloride, titanium hydride, potassium hydride, potassium fluoride, potassium chloride, nickel, nickel chloride and combinations thereof. Further, the dopants or catalytic additives can include other materials such as, but not limited to, aluminum, aluminum hydride, AlCl$_3$, MnCl$_2$, TiCl$_3$, TiF$_3$, FeCl$_2$, CoCl$_2$ and combinations thereof.

It is known in the art that Na, K, Li, Rb, Cs, Ba, Sr and Mg all dissolve in liquid ammonia to varying extents.

In an embodiment, the nanoporous template for the nanoconfined reversible hydrogen storage composition may be a nanoporous carbon; however, other nanoporous materials can be used, including silica, zeolites, alumina, or Metal-Organic Frameworks (MOFs). In an embodiment, the nanoporous material should be selected to be inert to the reactions in the system.

The term nanoporous includes materials having pore sizes of 0.2 to 1000 nm. In embodiments, the pore diameters may range from 1 nm to 200 nm, such as for example, 2-50 nm (subcategorized as mesoporous), or pore diameters of less than 2 nm, such as 0.2 to 2 nm (sub-categorized as microporous). Pore diameters were determined using the Barrett-Joyner-Halenda (BJH) size distribution determination method from Brunauer-Emmett-Teller (BET) nitrogen isotherm measurements.

In an embodiment, the nanoporous material may have a BET surface area of 300 to 6000 m$^2$/g, such as 350 to 1000 m$^2$/g, or 500 to 800 m$^2$/g. In an embodiment, the nanoporous material may have an apparent density of less than 2.5 g/cm$^3$, such as 0.1 g/cm$^3$ to 2.3 g/cm$^3$ to 1 g/cm$^3$, or 0.5 g/cm$^3$ to 2 g/cm$^3$, and a pore volume of more than 0.8 cm$^3$/g, such as 1 cm$^3$/g to 10 cm$^3$/g, or 2 cm$^3$/g to 5 cm$^3$/g. The nanostructured material disclosed herein will generally have diameters less than the pore size of the nanoporous template material. In an embodiment, the nanostructures will have an average particle diameter of less than 50 nm, such as 35 nm to 2 nm, or 25 nm to 10 nm. For example, in an embodiment, the nanostructures are 90% or more (such as 95% or more, or 98% or more) of nanostructured $Li_3N$ in particle sizes of 50 nm or lower.

The nanoporous template material can be synthesized in a variety of dimensions. For example, in an embodiment, thickness of the nanoporous material may be about 200 microns or less, such as about 10 microns to 180 microns, or about 50 microns to 150 microns. In an embodiment, multiple sheets of relatively thin nanoporous template material may provide more efficient loading of the hydrogen storage material into the pores of the template. The length and width of the material may be selected for the parameters of the particular application.

Very high loadings of the metal amide and metal hydride material were made possible with the method disclosed herein. In an embodiment, 30-90% of the available pore volume can be filled with hydrogen storage material, such as 40 to 65%, or 75 to 90%

In an embodiment, a method of making the complex metal hydrides described herein enables lithium nitride to be synthesized inside the pores of nanoporous hosts and has several advantages compared to existing methods. A previous approach includes obtaining nanoconfined $Li_3N$ in carbon nanoscaffolds by first confining lithium azide ($LiN_3$) and then decomposing it (releasing $N_2$) to form $Li_3N$. Since typical $LiN_3$ decomposition is highly explosive, it poses certain risks in handling and storage. Also, $LiN_3$ decomposition has the potential to create high local pressures in a nanopore, which might be problematic for maintaining the structural integrity of the nanoporous host. In contrast, the use of a liquid solvent, such as liquid ammonia as a means to infiltrate porous templates with metal amides circumvents the use of explosive materials, and is used for the incorporation of metal or metal hydrides inside the pores.

In an embodiment of a method for making the hydrogen storage nanocomposite material, a nanoporous template is combined with an alkaline or alkaline-earth metal dissolved in liquid ammonia. The metal may be in its elemental state prior to dissolution. The metal/ammonia solution fills in the pores of the nanoporous template. Capillary action may aid in this process. Other infiltration techniques such as liquid and vapor infiltration may be also be applied.

In an embodiment, this dissolution of the metal and impregnation of the nanoporous template may be effected by applying solid elemental metal on the surface of the nanoporous template, such as in a powdered form, and applying liquid ammonia to the materials. Ammonia has a boiling point below room temperature. Accordingly, to obtain the ammonia in a liquid state the temperature of the reaction environment may be reduced, such as in a glove box, to less than the boiling point of the solvent, that is less than −33° C. for ammonia, such as −33° C. to −100° C. In an embodiment, gaseous ammonia can be introduced to the reaction vessel, and as it cools it will condense to the liquid phase on the nanoporous template and lithium. The metal will dissolve and the solution will uptake into the pores of the template through capillary action. This process enhances the yield of metal amide/metal hydride in the pores of the nanoporous template and reduces excess ammonia. In alternative embodiments, the metal may be dissolved in a cooled liquid ammonia solution that is then applied to the nanoporous template.

After the solution has filled into the pores of the nanoporous template, the nanocomposite is allowed to warm to room temperature. This causes the reaction of the alkaline or alkaline-earth metal with ammonia to form nanostructures of the metal amide/metal hydride in the pores of the template, and the evaporation of the excess liquid ammonia. In alternative embodiments, heat can be applied to initiate the crystallization reaction and to remove the excess solvent.

The alkaline or alkaline-earth metal reacts with the ammonia to form crystalline nanostructures including an alkaline metal nitride or alkaline-earth metal nitride corresponding to formula I, a mixed metal amide-metal hydride composition of formula II, or both:

wherein M is independently selected from Li, Na, K, Rb, Cs, Be, Mg, Ca, Sr, Ba, or combinations thereof, and x, y, and z are independently selected from 1 or 2, and the nanostructures are formed in pores of the porous template. As mentioned above, this process allows the formation of beta $LiN_3$ in the nanoporous template. In an embodiment, beta $Li_3N$ is 90% or more of the $Li_3N$ in the nanoporous template, such as, 95 to 99.9%, or 99% to 100%. More generally, the same amounts of the $M_3Nx$ compound of formula I is in the beta state. We note here that both alpha and beta forms of $Li_3N$ function in hydrogen storage reactions, and this dependent on the pore size involved in the nanoconfinement.

In the synthesized nanostructured material, generally, any molar ratio of the metal amide and metal hydride can be suitable, such as 1:100 to 100:1 or 5:95 to 95:5. This ratio will change as cycling of the material takes place in use. The metal nitride phase can comprise one or more metals and can be prepared by decomposing the corresponding metal amides or metal amide/metal hydride mixtures at sufficient temperatures in an inert atmosphere or vacuum. These same basic reactions and principles apply substantially the same for alkali metals and alkaline earth metals other than lithium. However, lithium and magnesium have the lowest molecular weight and thus would be generally preferred for mobile systems or other systems where weight is an important consideration.

The catalyst or dopants mentioned above can be incorporated in the material by adding the catalyst to the ammonia solution along with the dissolved hydrogen storage metal. In one example, potassium can be added to lithium in the liquid ammonia solution, leading to nanoconfinement of $LiNH_2$ in the presence of K (existing likely as either KH or $KNH_2$). This represents a one-pot synthesis of a catalyzed nanoconfined metal amide hydrogen storage material which has proven very difficult to achieve using the current synthetic art.

The synthesized nanoconfined materials can be pelletized, compacted, or formed into a suitable form for incorporation into a hydrogen storage vessel.

An exemplary application of the systems disclosed herein is to reversibly store hydrogen, although other uses are not excluded. Other uses, for example, are thermal energy storage systems, in which the nanostructured metal amide/nitride material is used to reversibly store heat. Solar energy can also be used to decompose the metal amide/hydride to form the metal nitride and gaseous $H_2$; the amide/hydride material is then regenerated via the (exothermic) reaction of the nitride with $H_2$ at night.

Although other additives or catalysts may be present, the hydrogen storage compositions of the present invention predominantly (essentially) consist of the above-mentioned metal nitrides, amides and binary hydrides immobilized on a nanoporous template.

In operation, the reversible hydrogen storage composition can be heated to a temperature sufficient to form product hydrogen and a dehydrogenated composition from the reversible hydrogen storage composition. In an embodiment, the reversible hydrogen storage composition can be packaged in a tank for subsequent use in a fuel cell using standard methods and systems. For example, the composition can be filled into a modular container having a gas outlet and a hydrogen inlet for refilling/recharging.

Discharging the system to provide hydrogen-based clean energy can be performed at moderate temperatures and pressures as disclosed herein. This allows the system to be used in a fuel cell for powering applications such as electric vehicles.

The system can be recharged in a manner that supplements the loss of nitrogen from the hydrogen storage composition (should it occur) by using a hydrogen/nitrogen gas mixture for rehydriding the composition. It has been found that addition of small amounts of molecular $N_2$ in the $H_2$ gas stream improved the reversibility of bulk $Li_3N$ by supplementing the nitrogen lost as ammonia. The gas mixture may be applied to the system at pressure ranges disclosed herein in an amount sufficient to regenerate the reversible hydrogen storage composition as full as possible. This mixture may comprise hydrogen and nitrogen in a ratio of 1:10 to 1:10,000, 1:100 to 1:1000, or 1:20 to 1:200.

In an embodiment, a method of cycling an energy-storage nanocomposite material that includes a metal nitride or mixed metal amide-metal hydride nanostructures, or both. The method comprises the steps of cycling the nanocomposite material, including: charging hydrogen to the nanocomposite material to form a metal amide/metal hydride nanostructure in a hydrogenated state; discharging hydrogen from the nanocomposite material to directly form a metal nitride in a dehydrogenated state under mild conditions of temperature. In contrast to prior methods of cycling metal amide/metal hydride materials, an embodiment of the method and materials disclosed herein allow direct formation of the metal nitride without extreme conditions or pausing at the metal imide/metal hydride state. As such the method disclosed herein allows higher capacities of recyclable hydrogen and/or lower operating temperatures.

In an embodiment of the method using the materials disclosed herein at least 60% by weight of the total hydrogen stored in the nanocomposite material is discharged during the discharge cycle, such as 75% to 99.99%, or 90% to 99%. For example, in an embodiment in which $Li_3N$ is confined within nanoporous C, in a discharged (dehydrogenated) state, the nanoconfined material has 40 wt. % $Li_3N$, with the remaining 60% being the carbon host. Considering the 40 wt. % $Li_3N$ in isolation, that nanoconfined material can reversibly store 10 wt. % hydrogen. The overall nanoconfined material can reversibly store 0.4×10 wt. %=4 wt. % hydrogen. In an embodiment, in the dehydrogenated state, the nanocomposite material contains no more than 0.1 wt % hydrogen based on the total weight of the nanocomposite material and in the hydrogenated state the nanocomposite material contains 1 to 10 wt % hydrogen. These charged and discharged states can be reached with temperatures ranging from 50° C. to 500° C., 100° C. to 400° C., or 250° C. to 315° C., but more surprisingly at lower temperatures for nanoconfined materials, such as 80° C. to 300° C., or 120° C. to 180° C. Charging pressure may range, for example, from about 0.1 bar to about 300 bar, such as 10 bar to 200 bar, or 40 bar to 100 bar $H_2$. Without being bound by theory it is believed that by incorporating catalysts, such as potassium, into the composition, lower temperatures and pressures can efficiently be utilized.

In addition, the loss of nitrogen (primarily released in the form of ammonia) was substantially reduced in the nanoconfined material to an amount of 0.1% or less by weight of the total nitrogen in the system prior to cycling, such as 0.08 to 0.0001%, or 0.05 to 0.005%, even after 5 or more cycles. Furthermore, the kinetics of the hydrogen cycling were significantly improved for cycling the materials disclosed herein. For example, in the charging cycle, the reversible hydrogen storage nanostructured materials disclosed herein may reach half of the hydrogen absorption capacity in 10 minutes or less, such as 4 to 9 minutes, or 5 minutes to 8 minutes at 100 bar and 250° C.

In certain fuel cell applications, lower pressure and temperature discharge conditions are highly desirable, such as in fuel cell electric vehicles. In embodiments of the nanoconfined material disclosed herein, the metal hydride reaction can proceed at temperatures and pressures suitable for such applications, such as, for example, 80° C. to 120° C., or 85° C. to 100° C., or 90° C. to 105° C., and at 40 to 150 bar, such as 50 to 100 bar, or 60 to 80 bar.

EXAMPLES

Example 1

The following section, describes a detailed example of synthesis and characterization of a nanoconfined metal amide material using the novel and mild methods disclosed herein, producing a hydrogen storage material with improved properties. In this example, lithium amide ($LiNH_2$) was initially infiltrated into the pores of nanoporous carbon (having an average pore diameter of about 3 nm). (Nanoporous carbon is abbreviated npC.) The loading of the nanoporous carbon was accomplished by dissolution of metallic lithium in liquid ammonia at −78° C. (dry ice/acetone bath), followed by impregnation of the resulting $Li/NH_3$ solution into carbon pores, and finally, by removal of excess ammonia.

In the first step, lithium metal was completely dissolved in the liquid ammonia and then the solution was impregnated into the pores of nanoporous carbon by capillary effect since the nanoporous carbon was completely immersed in the liquid ammonia solution. The dissolution process was spontaneous and no heating or pressure was applied. The infiltration process occurred from several minutes (1 to 60 minutes) to several hours (2-16 hours), and then the excess ammonia was removed to yield the nanoconfined material.

The ammonia was then removed by slowly increasing the temperature from about −78° C. to about room temperature. This was accomplished simply by moving the experimental flask containing the solution to a room temperature environment and allowing the temperature to equilibrate to room temperature (approximately 21° C.). As the temperature of the materials increase, the metallic lithium reacted with and was converted into $LiNH_2$ that was nanoconfined inside the approximately 3 nm carbon pores, yielding $LiNH_2$ nanoconfined in carbon. This material is abbreviated $LiNH_2$@npC.

It should be noted that the ammonia can be recovered by condensing the vapors into a cold trap and reused for subsequent infiltrations.

Example 2

PXRD (powder X-ray diffraction) patterns were obtained of the nanoconfined material as shown in FIG. 1. FIG. 1 shows PXRD patterns of (a) as received, commercially obtained standard bulk $LiNH_2$, (b) nanoconfined $LiNH_2$@npC, (c) $LiNH_2$@npC cycled at 250° C. in hydrogenated form, and (d) $LiNH_2$@npC cycled at 250° C. in dehydrogenated form (i.e. $Li_3N$@npC). The patterns were shown as measured. Crystalline phases were represented by symbols: asterisks (*) for $LiNH_2$, triangles (Δ) for LiH, and circles (○) for β-$LiNH_2$.

It was known that $LiNH_2$+LiH hydrogen storage systems cycle through amide (—$NH_2$), imide (—NH), and (with enough energy) nitride (—N) compounds, according to Equation (1). PXRD revealed that upon thermally cycling the $LiNH_2$@npC material of Example 1, $LiNH_2$+LiH is formed in the hydrogenated state and β-$Li_3N$ is formed in the dehydrogenated state of the cycled material. The $LiNH_2$@npC material, upon heating, was transformed into $Li_3N$@npC. With hydrogenation, the nitride is converted into [$LiNH_{2+2}LiH$]@npC. It is noteworthy that the completely desorbed product of this nanoconfined system is β-$Li_3N$, which in bulk only occurs at high pressure/temperature. (See S. Cui, W. Feng, H. Hu, Z. Feng and Y. Wang, Solid State Commun., 2009, 149, 612-615.)

Example 3

In Example 3, an adsorption/desorption experiment was performed on the material of Example 1 in a Sieverts type apparatus. Five consecutive adsorption/desorption cycles of [$LiNH_2$+LiH]@npC at 250° C. with the temperature profile shown in black dashed line. Adsorption was performed at 100 bar $H_2$ pressure. The sample was cooled to room temperature before each subsequent desorption.

Figure 2:
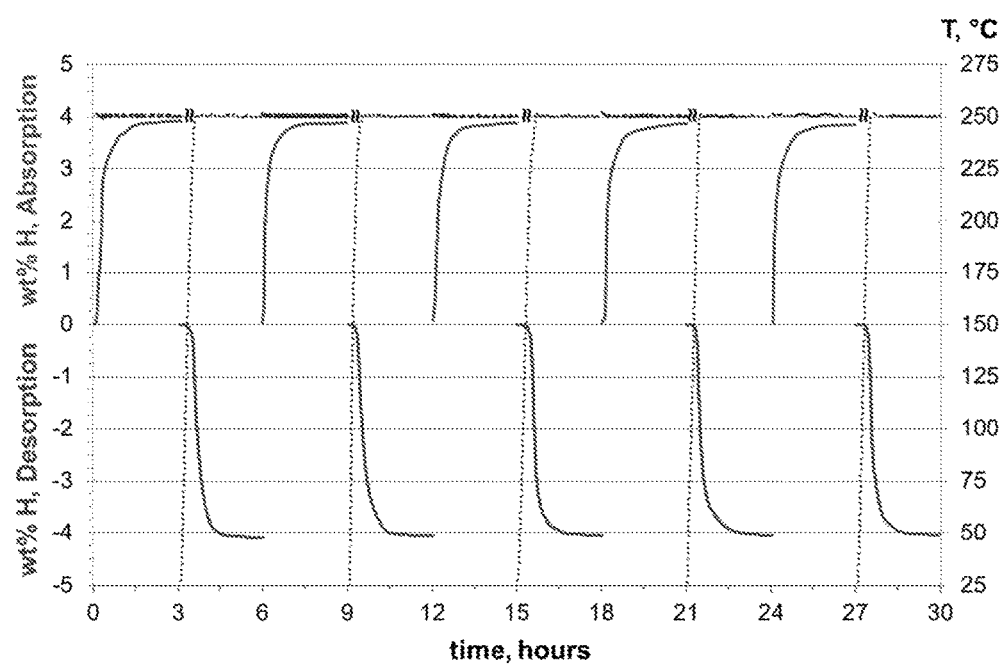
FIG. 2 shows a graph of temperature, time, and H absorption/desorption as an embodiment of the nanoconfined material was cycled.

FIG. 2 showed a promising result of about 4 wt % of $H_2$ being reversibly stored in the $Li_3N$@npC material at relatively low pressures and temperatures. (The weight percent of $H_2$ is based on the total weight of the nanocomposite material.) The observed reversible hydrogen storage capacity is one of the highest ever achieved for a nanoconfined metal hydride hydrogen storage material at 250° C. Hydrogen adsorption by $Li_3N$@npC at 100 bar and 250° C. was particularly fast with half of the capacity being reached in 10 min.

In addition, the material can be cycled without any significant decrease in hydrogen capacity. After 5 consecutive cycles, the nanoconfined [$LiNH_2$+LiH]@npC material exhibited a minimum capacity loss. The measured hydrogen content after the first cycle is 4.09, while after 5 cycles the measured capacity is slightly lower at 4.01 wt % hydrogen. Thus, the hydrogen capacity degraded by only 0.08% upon 5 cycles. The data shown in FIG. 2 also indicated a single-step reaction mechanism, since the hydrogen uptake and release curves show no breaks that could be attributed to a multi-step reaction such as that indicated by Equation (1). This is surprising given the known difficulty and energy requirements to fully dehydride the metal amide to the metal nitride state in bulk materials. Such bulk materials would show a break in the curve where the reaction is paused at the intermediate metal imide/metal hydride step.

It is expected that by incorporating catalysts in the nanostructured material that an even higher reversible hydrogen storage percent can be achieved.

The term "consisting essentially" as used herein means the specified materials or steps and those that do not materially affect the basic and novel characteristics of the material or method. Here those characteristics are set forth herein and include, safer starting materials with reduced potential for explosion at high pressure, improved hydrogen storage capacity, improved recyclability, and the ability to use less extreme temperature and pressure conditions in using the hydrogen storage material.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. All percentages and averages are by weight unless the context indicates otherwise. The articles "a," "an," and "the," should be interpreted to mean "one or more" unless the context indicates the contrary.

What is claimed is:

1. A process for making a nanocomposite, comprising the steps of:
    combining a nanoporous template with an alkaline or alkaline-earth metal dissolved in liquid ammonia;
    reacting the alkaline or alkaline-earth metal with ammonia to form nanostructures including an alkaline metal nitride or alkaline-earth metal nitride corresponding to formula I, a mixed metal amide-metal hydride composition of formula II, or both:

$$M_3N_x \qquad (I)$$

$$M(NH_2)_y/MH_z \qquad (II)$$

wherein M is independently selected from Li, Na, K, Rb, Cs, Be, Mg, Ca, Sr, Ba, or combinations thereof, and x, y, and z are independently selected from 1 or 2, wherein the nanostructures form in pores of the porous template.

2. The process of claim 1, wherein the alkaline or alkaline-earth metal is in an elemental state prior to dissolving.

3. The process of claim 1, wherein the nanostructures comprise alpha or beta $Li_3N$.

4. The process of claim 1, wherein the nanostructures comprise $Li_3N$, and 90% or more of the $Li_3N$ is beta-$Li_3N$.

5. The process of claim 1, further comprising removing excess ammonia by evaporation of unreacted solvent.

6. The process of claim 1, wherein the combining step is performed at a temperature of −33° C. to −100° C.

7. The process of claim 1, further comprising dissolving a catalyst or dopant in the liquid ammonia and forming the nanostructures with the catalyst or dopant in the pores of the nanoporous template.

8. The process of claim 7, wherein the catalyst or dopant is selected from the group consisting of: titanium trichloride, titanium tetrachloride, titanium hydride, potassium hydride, potassium fluoride, potassium chloride, nickel, nickel chloride and combinations thereof.

9. The process of claim 7, wherein the catalyst or dopant is selected from the group consisting of: aluminum, aluminum hydride, $AlCl_3$, $TiCl_3$, $TiF_3$, $MnCl_2$, $FeCl_2$, $CoCl_2$ and combinations thereof.

10. A reversible hydrogen-storage nanocomposite comprising:
a nanoporous template; and
nanostructures comprising an alkaline metal nitride or alkaline-earth metal nitride corresponding to formula I, a mixed metal amide-metal hydride composition of formula II, or both:

$$M_3N_x \quad (I)$$

$$M(NH_2)_y/MH_z \quad (II)$$

wherein M is independently selected from Li, Na, K, Rb, Cs, Be, Mg, Ca, Sr, Ba, or combinations thereof, and x, y, and z are independently selected from 1 or 2, and the nanostructures are confined in pores of the nanoporous template;
wherein the weight percent of the nanostructures corresponding to formulas I or II is 30% or greater based on the total weight of the nanocomposite.

11. The nanocomposite of claim 10, wherein the nanoporous template has an apparent density of less than 2.5 g/cm$^3$ and a pore volume of more than 0.8 cm$^3$/g.

12. The nanocomposite of claim 10, wherein the nanoporous template is selected from mesoporous or microporous carbon, silica, alumina, zeolite, or a Metal-Organic Framework, or combinations thereof.

13. The nanocomposite of claim 10, wherein the nanostructures have a weight-average particle diameter of less than 50 nm.

14. The nanocomposite of claim 10, wherein M is lithium.

15. The nanocomposite of claim 10, wherein the nanostructures comprise 90% or more of nanostructured Li$_3$N in particle sizes of 50 nm diameter or lower.

16. The nanocomposite of claim 10, wherein the nanostructures further comprise KH, KNH$_2$, or both.

17. A method of cycling an energy-storage nanocomposite material that includes metal nitride or mixed metal amide-metal hydride nanostructures, or both, the method comprising the steps of:
cycling the nanocomposite material, including:
charging hydrogen to the nanocomposite material to form a metal amide/metal hydride nanostructure in a hydrogenated state;
reversibly discharging hydrogen from the nanocomposite material to directly form a metal nitride in a dehydrogenated state according to at least one of the following reactions:

$M'_3N+2H_2 \Leftrightarrow 2M'H+M'NH_2$, wherein M' is an alkali metal or $M''_3N_2+4H_2 \Leftrightarrow M''(NH_2)_2+2M''H_2$, wherein M'' is an alkaline-earth metal;

wherein the temperature of the nanocomposite material in the cycling step is 80° C. to 300° C.

18. The method of claim 17, wherein at least 60% by weight of the total hydrogen stored in the nanocomposite material is discharged during the discharge cycle.

19. The method of claim 17, wherein in the dehydrogenated state, the nanocomposite material contains no more than 0.1 wt % hydrogen based on the total weight of the nanocomposite material and in the hydrogenated state the nanocomposite material contains 1 to 10 wt % hydrogen.

20. The method of claim 17, wherein after cycling the nanoporous material, the nanocomposite loses less than 0.1% hydrogen by weight in storage capacity per cycle.

* * * * *